United States Patent
Wang et al.

(10) Patent No.: US 7,652,462 B2
(45) Date of Patent: Jan. 26, 2010

(54) CONSTANT CURRENT REGULATOR WITH CURRENT SENSING CIRCUIT LOOP

(75) Inventors: Ming-Chia Wang, Sijhih (TW); Hung-Chi Chu, Kaohsiung (TW); Yuhren Shen, Tainan (TW)

(73) Assignee: Vastview Technology, Inc., Hsin-Chu, Hsien (TW)

( * ) Notice: Subject to any disclaimer, the term of this patent is extended or adjusted under 35 U.S.C. 154(b) by 302 days.

(21) Appl. No.: 11/907,545

(22) Filed: Oct. 15, 2007

(65) Prior Publication Data
US 2009/0051338 A1 Feb. 26, 2009

(30) Foreign Application Priority Data
Aug. 24, 2007 (TW) .............................. 96131569 A

(51) Int. Cl.
G05F 1/40 (2006.01)
G05F 1/10 (2006.01)

(52) U.S. Cl. ........................ 323/285; 323/222; 323/282

(58) Field of Classification Search .................. 323/222, 323/223, 225, 268, 271, 282, 285, 349–351
See application file for complete search history.

(56) References Cited

U.S. PATENT DOCUMENTS

| | | | | |
|---|---|---|---|---|
| 6,194,884 B1 * | 2/2001 | Kesler et al. | ................. | 323/285 |
| 7,084,612 B2 * | 8/2006 | Zinn | ........................... | 323/266 |
| 7,218,080 B2 * | 5/2007 | Yang | ........................... | 323/222 |
| 7,301,312 B2 * | 11/2007 | Nishino | ...................... | 323/222 |
| 7,368,957 B2 * | 5/2008 | Clarkin et al. | .............. | 327/110 |

* cited by examiner

Primary Examiner—Matthew V Nguyen
(74) Attorney, Agent, or Firm—Rosenberg, Klein & Lee

(57) ABSTRACT

A constant current regulator includes a current sensing circuit loop connected to a switch unit of the constant current regulator to detect a current flowing through the switch unit and to generate a detection current that is in proportion to the current flowing through the switch unit. The detection current flows through a detection resistor to induce a detection voltage. A differential amplifier bases on a set voltage and the received detection voltage to generate an error voltage to a pulse width modulation controller, which in turn causes a gate driver circuit to control the switching operation of the switch unit thereby supplying a constant current to a load connected to an output voltage of the regulator.

17 Claims, 17 Drawing Sheets

CONSTANT CURRENT REGULATOR WITH CURRENT SENSING CIRCUIT LOOP

FIELD OF THE INVENTION

The present invention relates to a constant current regulator, and in particular to a constant current regulator with a current sensing circuit loop for supplying a constant current to a load.

BACKGROUND OF THE INVENTION

Light-emitting diodes (LEDs) have been widely used in the applications of lighting and backlighting. Different applications of the LEDs require different color lighting and different powers of the LEDs. For all types of LED that are currently available, the best performance is often exhibited in a constant-current driving. Thus, a power supply circuit that is designed for driving LED based circuit must be of the characteristics of supplying a constant current output. Often, a constant current regulator is used to provide the desired constant-current power supply. In all types of circuit, to ensure constant and identical current flowing through all the LEDs, the LEDs have to be connected in series.

Various types of constant current regulators are available, including buck type constant current regulator and boost type constant current regulator.

SUMMARY OF THE INVENTION

FIG. 1 of the attached drawings shows a control circuit of a conventional buck type constant current regulator, which is generally designated with reference numeral 1a. The buck type constant current regulator 1a comprises a first switch unit SW1 and a second switch unit SW, wherein the first switch unit SW1 has a drain connected to an input voltage Vin and a source serially connected to an inductor L and further connected to an output voltage Vo. The second switch unit SW2 has a drain connected to a node between the inductor L and the source of the first switch unit SW1 and a source connected to a ground potential. The input voltage Vin is connected in parallel with an input capacitor Cin.

The first and second switch units SW1 and SW2 both have a gate that is connected to a gate driver circuit 11. A pulse width modulation (PWM) controller 12 controls, via the gate driver circuit 11, the switching operation of the first and second switch units SW1 and SW2.

A load 2 comprises a number of light-emitting diodes (LEDs) connected in series and is connected to the output voltage Vo in such a way that a positive terminal of the load 2 is connected to the output voltage Vo and a negative terminal of the load 2 is connected in series to a detection resistor Rs and further grounded. When a load current $I_L$ flows through the load 2, a feedback voltage Vfb is obtained at a node connected between the negative terminal of the load 2 and the detection resistor Rs.

The feedback voltage Vfb is applied to a feedback voltage input terminal of a differential amplifier 13, while a reference voltage input terminal of the amplifier 13 receives a reference voltage Vref. The differential amplifier 13 has an error signal output terminal that is connected to an RC circuit comprised of a resistor Rc and a capacitor Cc and is also connected to the PWM controller 12. Based on an error between the reference voltage Vref and the feedback voltage Vfb, the differential amplifier 13 generates, at the error signal output terminal, an error voltage Ve that is applied to the RC circuit and the PWM controller 12.

In the circuit of such a conventional arrangement, the detection resistor Rs is serially connected to a large current circuit loop through which the load current $I_L$ flows. Thus, when the load current $I_L$ gets larger, the detection resistor Rs consumes a larger power.

FIG. 2 of the attached drawings shows a control circuit of another conventional buck type constant current regulator, which is designated with reference numeral 1b. This conventional buck type constant current regulator 1b comprises a first switch unit SW1, a second switch unit SW2, an inductor L, a gate driver circuit 11, a PWM controller 12, a comparator 14, a detection resistor Rs, and a reference voltage unit 15. The detection resistor Rs is serially connected between an input voltage Vin and a drain of the first switch unit SW1. The reference voltage unit 15 supplies a reference voltage Vref to a reference voltage input terminal of the comparator 14. The load 2 is comprised of a number of LEDs connected in series and has an end connected to an output voltage Vo and an opposite end connected to ground potential. In such a circuit, the detection resistor Rs is also serially connected to a large current circuit loop through which a load current $I_L$ that travels through the load 2 flows.

FIG. 3 of the attached drawings shows a control circuit of a conventional boost type constant current regulator, which is designated with reference numeral 1c. The conventional boost type constant current regulator 1c comprises a first switch unit SW1 and a second switch unit SW2, wherein the first switch unit SW1 has a drain connected via an inductor L to an input voltage Vin and a source set in ground potential. The second switch unit SW2 has a drain connected to a node between the inductor L and the drain of the first switch unit SW1 and a source connected to an output voltage Vo. The output voltage Vo is connected in parallel with an output capacitor Co.

The first and second switch units SW1 and SW2 both have a gate that is connected to a gate driver circuit 11. A PWM controller 12 controls, via the gate driver circuit 11, the switching operation of the first and second switch units SW1 and SW2.

A load 2, which is comprised of a number of light-emitting diodes (LEDs) connected in series, is connected to the output voltage Vo in such a way that a positive terminal of the load 2 is connected to the output voltage Vo and a negative terminal of the load 2 is connected in series to a detection resistor Rs and further grounded. When a load current $I_L$ flows through the load 2, a feedback voltage Vfb is obtained at a node connected between the negative terminal of the load 2 and the detection resistor Rs.

The feedback voltage Vfb is applied to a feedback voltage input terminal of a differential amplifier 13, while a reference voltage input terminal of the amplifier 13 receives a reference voltage Vref. The differential amplifier 13 has an error signal output terminal that is connected to an RC circuit comprised of a resistor Rc and a capacitor Cc and is also connected to the PWM controller 12. Based on an error between the reference voltage Vref and the feedback voltage Vfb, the differential amplifier 13 generates, at the error signal output terminal, an error voltage Ve that is applied to the RC circuit and an error signal input terminal of the PWM controller 12.

In the circuit of such a conventional arrangement of FIG. 3, the detection resistor Rs is serially connected to a large current circuit loop through which the load current $I_L$ flows. Thus, when the load current $I_L$ gets larger, the detection resistor Rs consumes a larger power even though the resistor Rs has a small resistance.

FIG. 4 of the attached drawings shows a control circuit of another conventional boost type constant current regulator, which is designated with reference numeral 1d. This conventional boost type constant current regulator 1d comprises a first switch unit SW1, a second switch unit SW2, an inductor L, a gate driver circuit 11, a PWM controller 12, a comparator 14, a reference voltage unit 15, and a detection resistor Rs. The detection resistor Rs is serially connected between a source of the first switch unit SW1 and the ground. The load 2 is comprised of a number of LEDs connected in series and has an end connected to an output voltage Vo and an opposite end grounded. The reference voltage unit 15 supplies a reference voltage Vref to a reference voltage input terminal of the comparator 14. In such a circuit, the detection resistor Rs is similarly connected in series to a large current circuit loop constituted by the first switch unit SW1 so that when the current flowing through the first switch SW1 gets larger, the detection resistor Rs consumes a larger power even though the resistor Rs has a small resistance.

These four types of conventional constant current regulators all employ a circuit design that connects the detection resistor in series to a circuit loop that flows a large current of the control circuit. Thus, even though the detection circuit Rs has a very small resistance, due to the large current flowing therethrough, a significant voltage drop is generated across the resistor, which means a significant amount of power is consumed.

Besides the above described four conventional constant current regulator, other circuits are also found in prior art references. For example, U.S. Pat. No. 7,135,825 discloses an LED driving circuit, which also connects a detection resistor in a loading circuit loop of the LEDs to generate a feedback voltage. Thus, in the power supply circuit of the reference, since the detection resistor is serially connected to the load, when the current flowing through the load gets large, even though the resistor has a small resistance, the resistor still consumes a large amount of power. Another example is disclosed in U.S. Pat. No. 6,980,181, wherein a driving circuit is provided for LEDs, comprising a detection resistor connected in series to a switching circuit loop thereof to generate a feedback voltage that is applied to an error amplifier. The switching circuit loop is still considered a large current circuit loop and once again the circuit of the reference suffers the same drawback of significant consumption of power.

In view of the above problems existing in the known devices, an objective of the present invention is to provide a current feedback type constant current regulator, which with no detection resistor connected in a large current circuit loop, detects a current flowing through a load to generate a feedback signal and regulates and supplies a constant current to the load based on the feedback signal.

Anther objective of the present invention is to provide a constant current regulator combining a current sensing circuit loop, wherein the current sensing circuit loop is connected a switch unit of the constant current regulator to detect a current flowing through the switch unit and generate a detection current that is in proportion to the current flowing through the switch unit to thereby control the switching operation of the switch unit based on the detection current.

A further objective of the present invention is to provide a constant current power supply that is particularly suitable for an array of serially connected light-emitting diodes, wherein a load circuit loop constituted by the serially connected light-emitting diodes requires no detection resistor connected thereto.

Compared to the known technology, the present invention uses the technology of current sensing circuit loop combined with a constant current regulator to generate a detection current that is in proportion to a current flowing through a switch unit or a load for controlling the current supplied to the load. Since no detection resistor is connected to a load circuit loop, no large amount of power is consumed by the detection resistor provided in the load circuit loop as taught by the known technology. Further, in accordance with the present invention, the detection resistor is connected to a current mirror circuit employed in the current sensing circuit loop and thus the resistance of the detection resistor is not subjected to any limitation. This is different from the known technology in which only resistors of small resistance can be used. Thus, the present invention provides more flexibility to circuit design.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
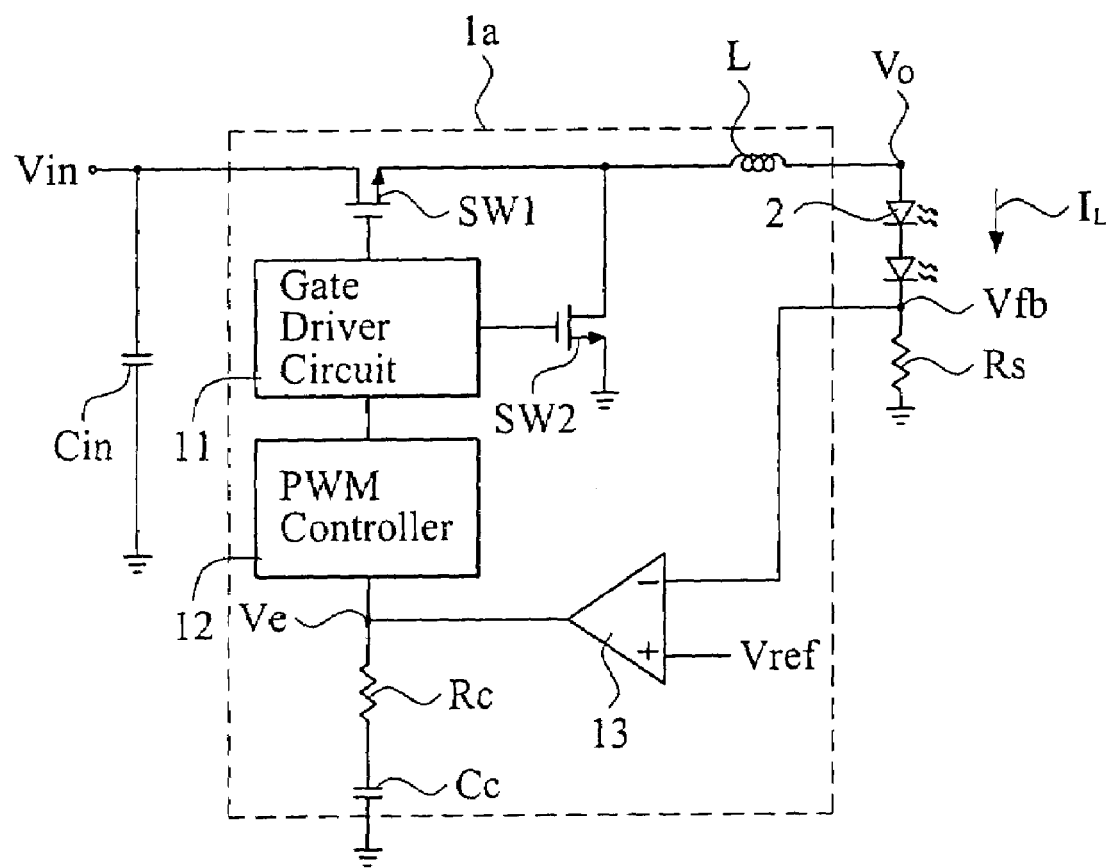
FIG. 1 is a circuit diagram of a conventional buck type constant current regulator.
Figure 2:
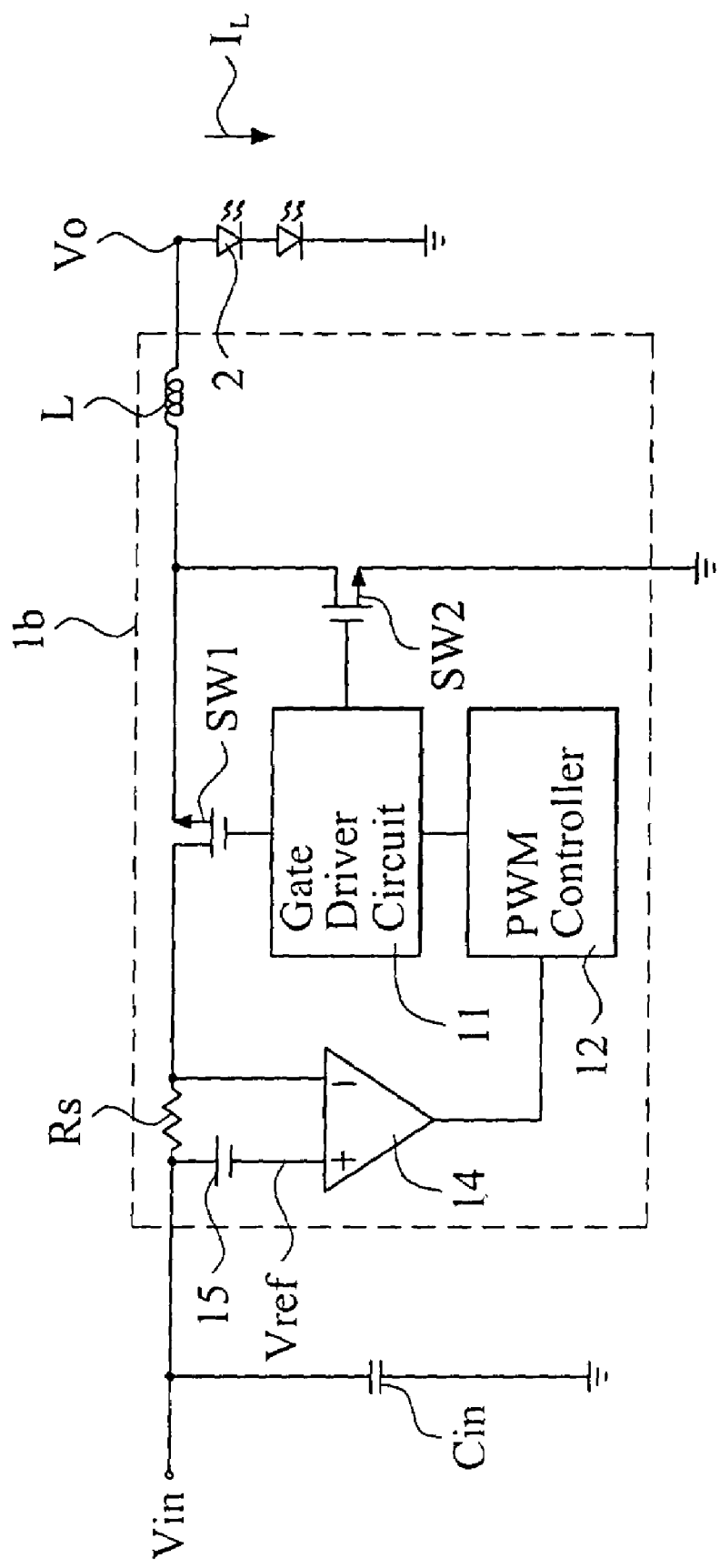
FIG. 2 is a circuit diagram of another conventional buck type constant current regulator.
Figure 3:
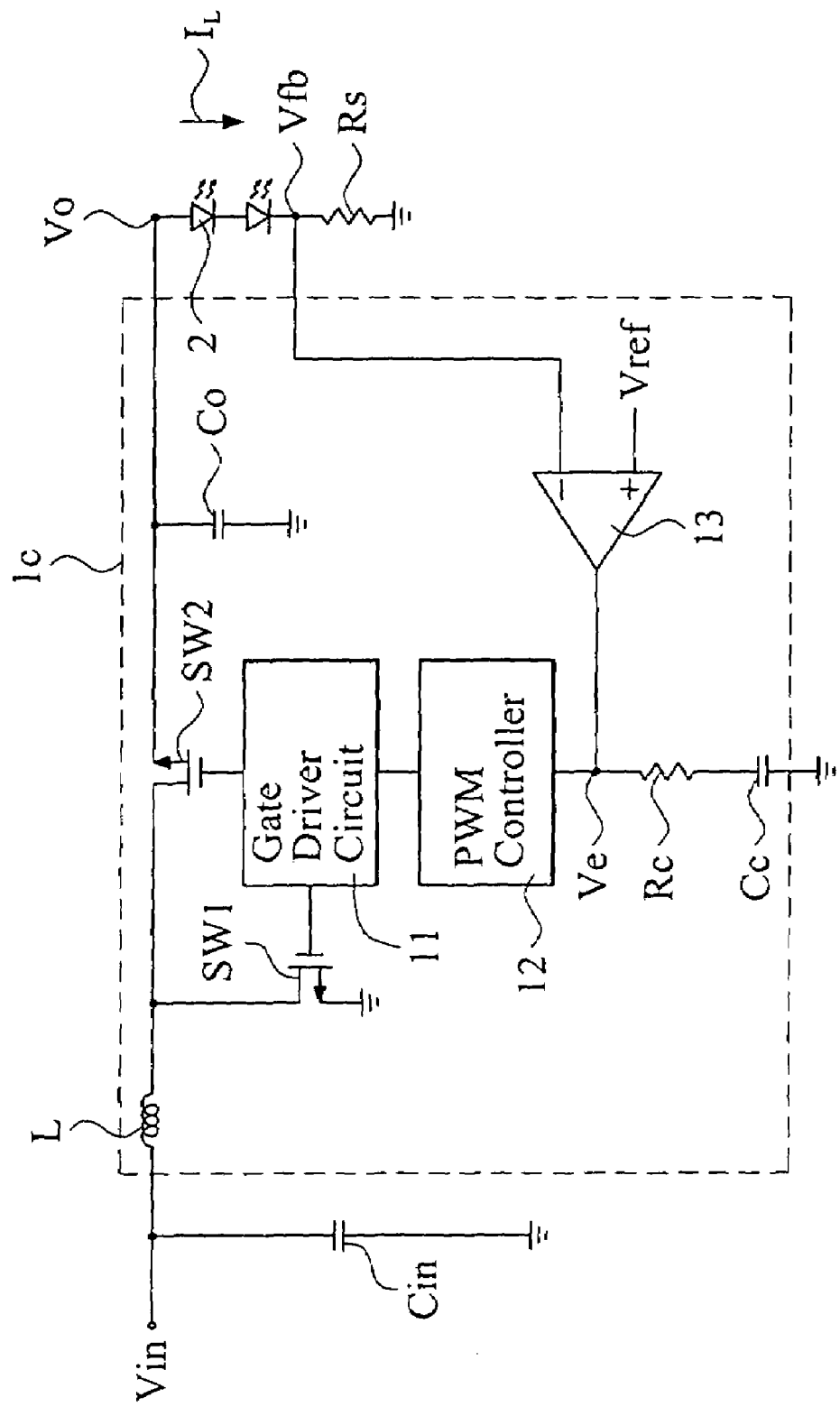
FIG. 3 is a circuit diagram of a conventional boost type constant current regulator.
Figure 4:
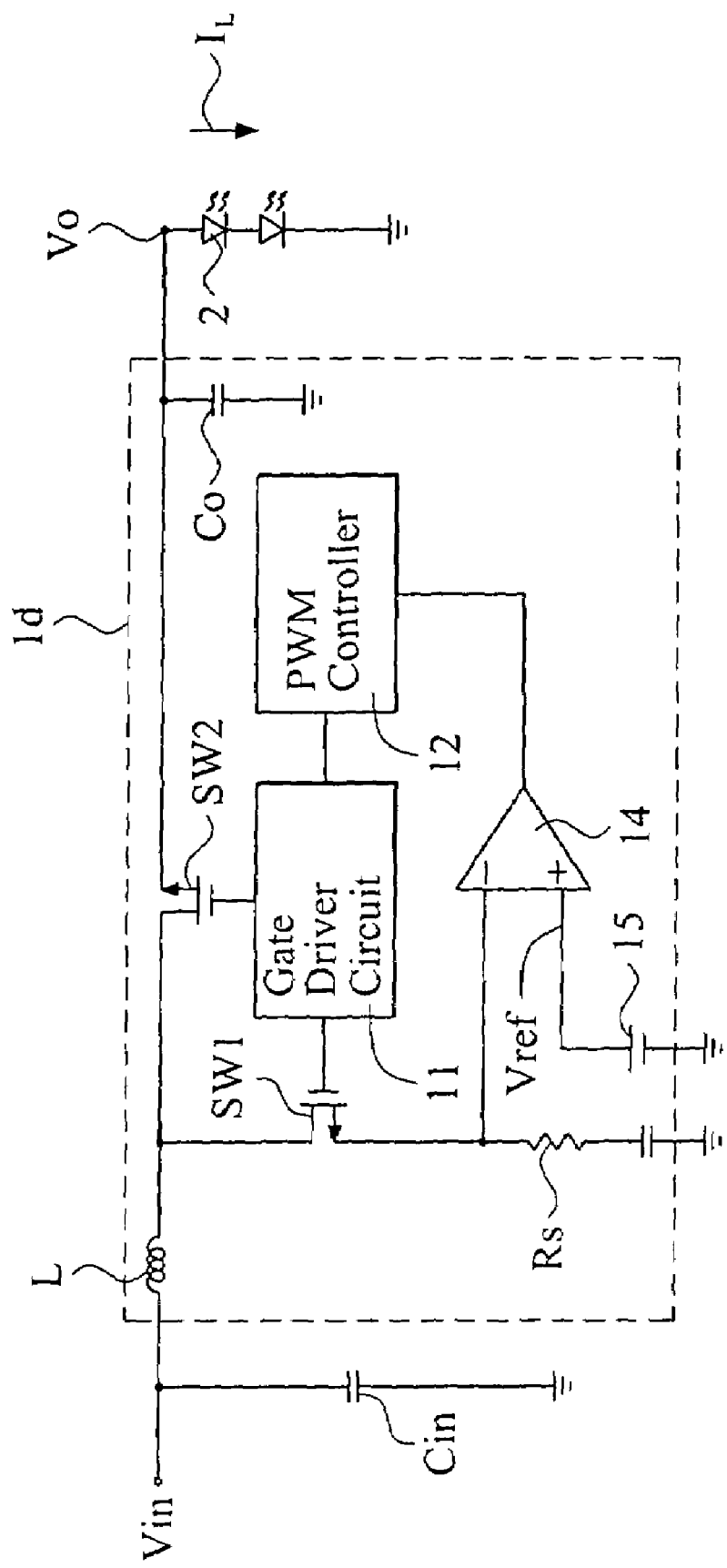
FIG. 4 is a circuit diagram of another conventional boost type constant current regulator.
Figure 5:
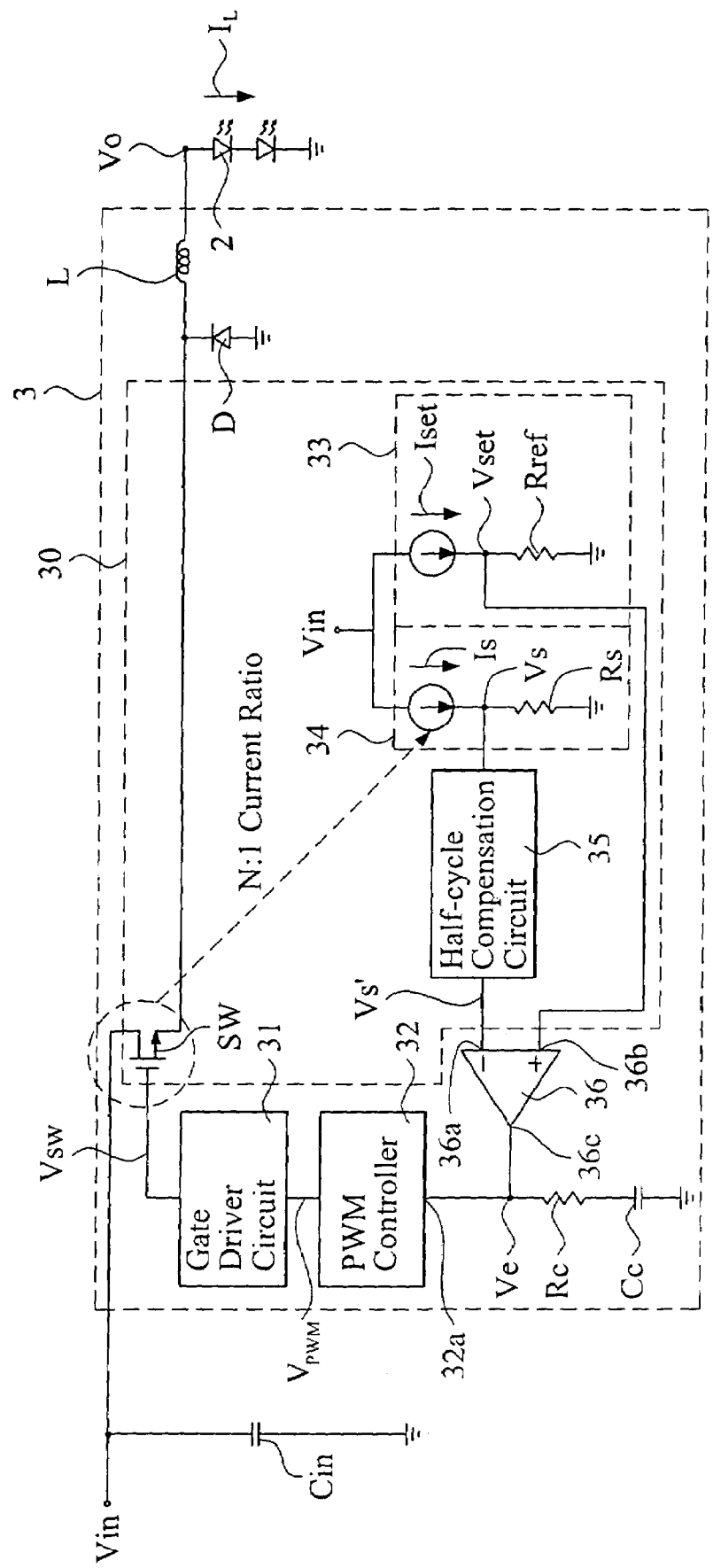
FIG. 5 is a circuit diagram of a constant current regulator constructed in accordance with a first embodiment of the present invention.

With reference to the drawings and in particular to FIG. 5, a control circuit in accordance with a first embodiment of the present invention is shown, which is applicable to a buck type half-cycle sensing constant current regulator. For simplicity, parts/component/devices that are identical or similar to the counterparts illustrated in the prior art devices described previously carry the same reference numerals.

The constant current regulator in accordance with the first embodiment of the present invention and shown in FIG. 5 is broadly designated at 3, comprising a switch unit SW having a drain (first terminal) connected to an input voltage Vin and a source (second terminal) connected via an inductor L to an output voltage Vo. The source of the switch unit SW is also connected to a negative terminal of a diode D. The diode D has a positive terminal that is grounded. The diode D can be, for example, a Schottky diode.

A load 2, which is comprised of a number of light-emitting diodes (LEDs) connected in series, has an end connected to the output voltage Vo and an opposite end grounded.

The switch unit SW has a gate connected to a gate driver circuit 31. A pulse width modulation (PWM) controller 32 has an error signal input terminal 32a connected to an RC circuit constituted by a resistor Rc and a capacitor Cc. The error signal input terminal 32a of the PWM controller 32 functions to receive an error signal Ve, based on which the PWM controller 32 generates a pulse width modulation signal $V_{PWM}$ to the gate driver circuit 31, which in turn generates a switching control signal $V_{SW}$ to control the switching operation of the switch unit SW.

The constant current regulator 3 of the present invention further comprises a current feedback circuit loop 30, which is also referred to as a current sensing circuit loop, functioning to detect or sense the current flowing through the switch unit SW and to provide inputs to a differential amplifier 36, which generates and supplies an error signal Ve to the PWM controller 32.

The current sensing circuit loop 30 comprises a current setting circuit 33, which receives a working voltage from the input voltage Vin. The current setting circuit 33 is comprised of an adjustable current source Iset and a serially connected resistor Rref. When a current from the adjustable current source Iset flows through the resistor Rref, a set voltage Vset is obtained across the resistor Rref.

A current detection circuit 34 receives a working voltage from the input voltage Vin. The current detection circuit 34 is comprised of a detection current Is and a serially connected resistor Rs. When the detection current Is flows through the resistor Rs, a detection voltage Vs is induced across the resistor Rs. The detection current Is and a load current $I_L$ flowing through the switch unit SW are of a proportional relationship N:1, such as the phantom line indicating the N:1 current ratio illustrated in the drawing.

Since the instant embodiment is applied to a buck type half-cycle sensing constant current regulator, the detection voltage Vs generated by the current detection circuit 34 is subjected to the processing of a half-cycle compensation circuit 35 to generate a half-cycle compensated detection voltage Vs' to a detection voltage input terminal 36a of the differential amplifier 36. The set voltage Vset generated by the current setting circuit 33 is applied to a set voltage input terminal 36b of the differential amplifier 36. Based on the feed signal Vset and the half-cycle compensated detection voltage Vs', the differential amplifier 36 generates, at a differential signal output terminal 36c thereof, the error voltage Ve, which is then applied to the error signal input terminal 32a of the PWM controller 32.

Figure 6:
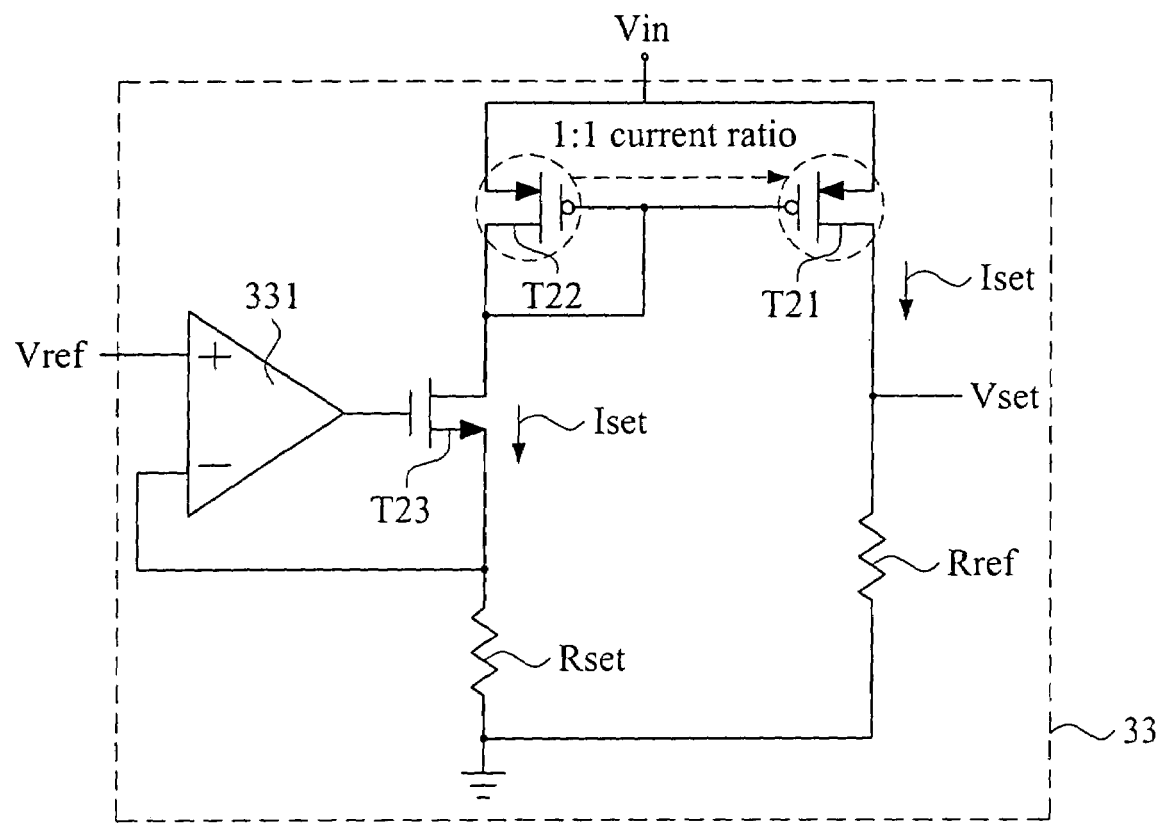
FIG. 6 is a further, detailed circuit diagram of a current setting circuit of the constant current regulator of FIG. 5.

FIG. 6 shows a further, detailed control circuit for the current setting circuit 33 of FIG. 5, comprising a feedback amplifier 331, switch units T21, T22, T23, resistors Rref, Rset that together form a current mirror circuit, whereby the current Iset flowing through the switch unit T21 is set identical to the current Iset flowing through the switch unit T22, which is illustrated in the phantom line indicating the 1:1 current ratio in the drawings. Since a current mirror circuit is adopted, the resistance of the resistor Rset is not subject to any limitation and this is on the contrary to the conventional technology that must use a small resistance resistor.

Figure 7:
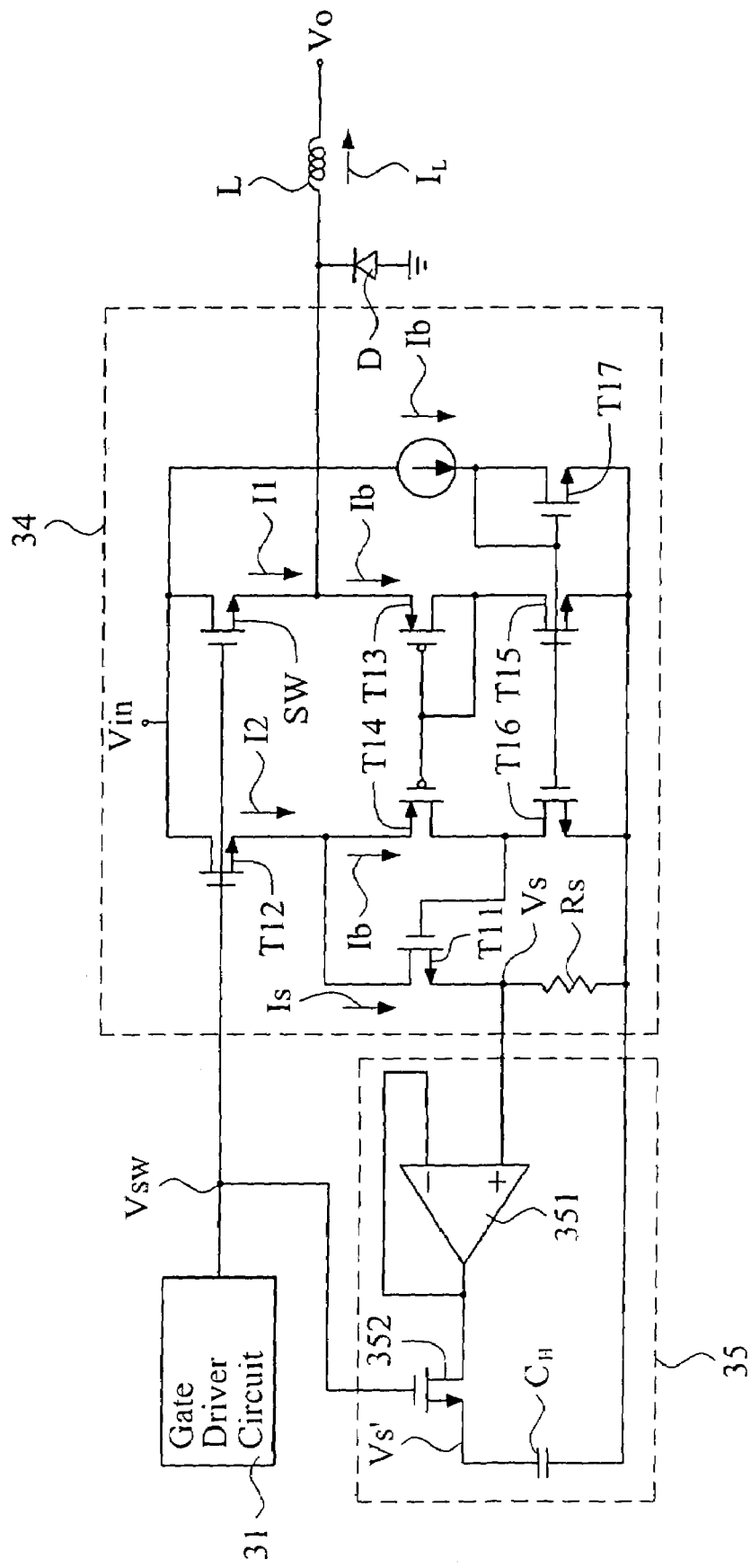
FIG. 7 is a further, detailed circuit diagram of a current detection circuit and a half-cycle compensation circuit of the constant current regulator of FIG. 5.

FIG. 7 shows a further, detailed control circuit of the current detection circuit 34 and the half-cycle compensation circuit 35 of FIG. 5, comprising switch units SW, T12, T13, T14, T15, T16, T17, which together form a current mirror circuit. When the switch unit SW is conducted on, the following relationships among currents I1, I2, $I_L$, Is are satisfied:

$$I1 \gg Ib, I2 \gg Ib$$

$$I1 = N \times I2$$

$$I1 = I_L = N \times I2 = N \times Is = N \times (Iset \times Rref/Rs)$$

$$I_L/N = Is$$

Namely, the detection current Is and the load current $I_L$ satisfy N:1 ratio.

The half-cycle compensation circuit 35 comprises a coupler 351, a half-cycle compensation switch unit 352, and a capacitor $C_H$. The coupler 352 receives the detection voltage Vs from the current detection circuit 34. The half-cycle compensation switch unit 352 has a gate connected to the gate driver circuit 31 and is controlled by the switching control signal $V_{SW}$ generated by the gate driver circuit 31. The half-cycle compensation switch unit 352 has a source connected to the capacitor $C_H$.

Figure 8:
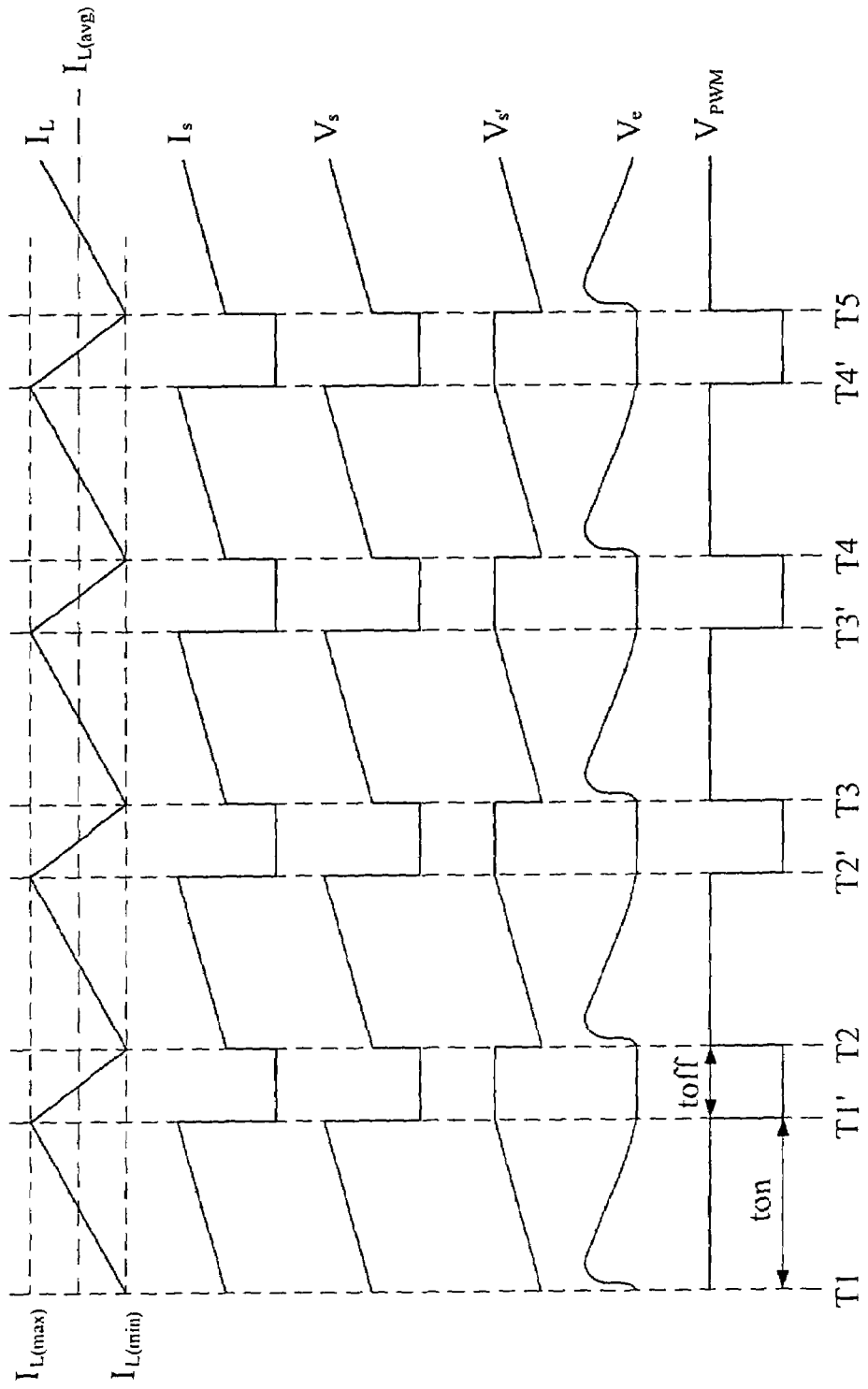
FIG. 8 shows waveforms taken at nodes of the constant current regulator of FIG. 5.

FIG. 8 shows the waveforms of signals taken at the nodes of the circuit of FIG. 5. In the drawing, $I_{L(max)}$ indicates the maximum load current, $I_{L(min)}$ indicates the minimum load current, and $I_{L(avg)}$ indicates the average of the load current. When a load current $I_L$ flows through the load 2, the current detection circuit 34 detects a detection current Is caused by a positive half cycle (within the time period ton between time points T1 and T1') of the load current $I_L$ and induces a detection voltage Vs. The detection voltage Vs, after transmitted through the half-cycle compensation circuit 35, is applied to the differential amplifier 36 to induce an error signal Ve at the differential signal output terminal 36c of the differential amplifier 36. The PWM controller 32, when receiving the error signal Ve, generates a gate driving voltage $V_{PWM}$ of a high level, which is processed by the gate driver circuit 31 to generate a switching control signal $V_{SW}$ that controls the switching operation of the switch unit SW.

When a negative half-cycle (within the time period toff between time points T1' and T2) of the load current $I_L$ passes through the load 2, the current detection circuit 34 detects no load current $I_L$, and induces zero detection voltage Vs. Within the negative half cycle of the load current $I_L$, the capacitor $C_H$ of the half-cycle compensation circuit 35 maintains the detection voltage Vs that was generated by the current detection circuit 34 to ensure that the PWM controller 32 does not take false action in carrying out pulse width modulation.

Figure 9:
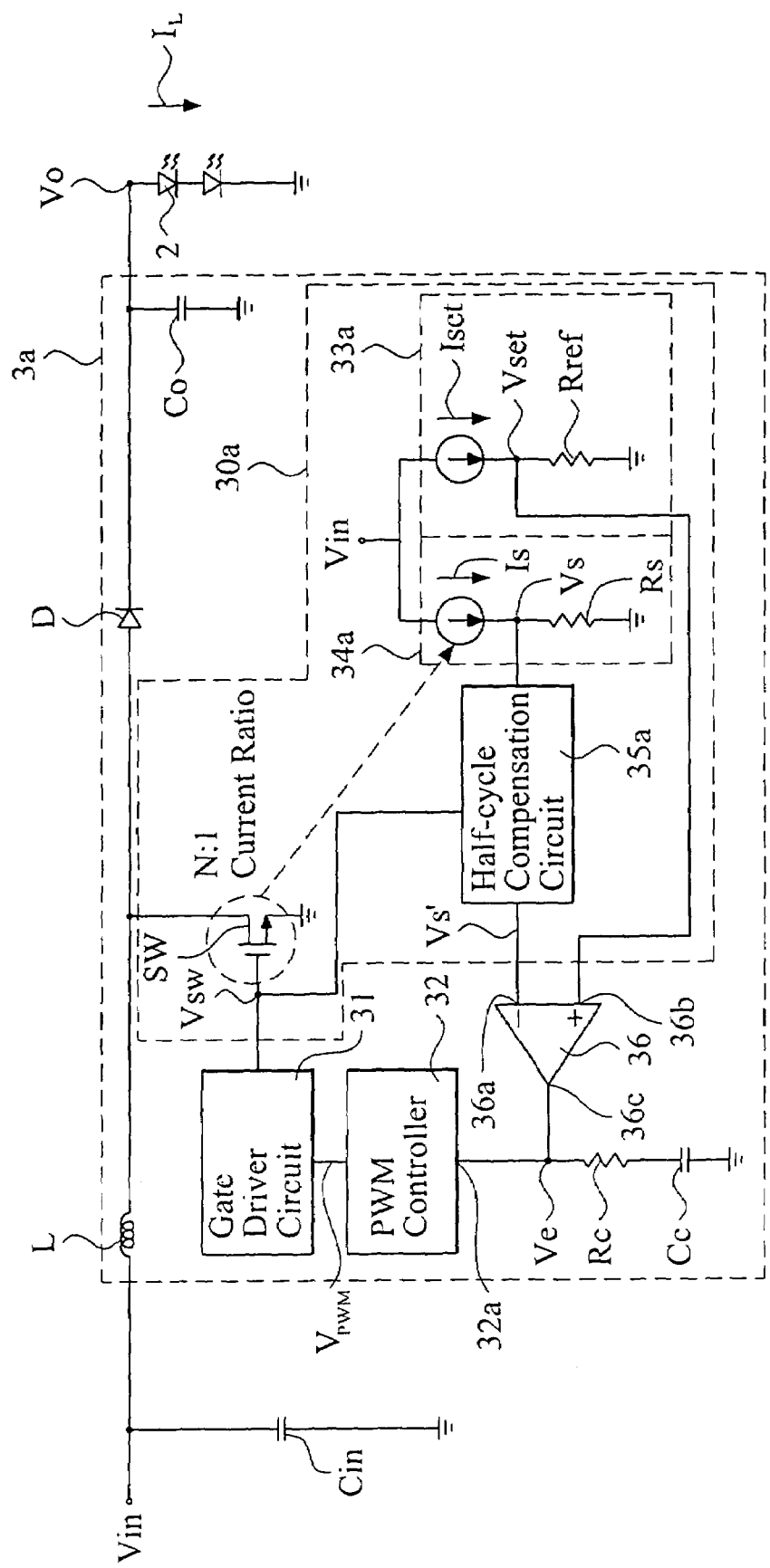
FIG. 9 is a circuit diagram of a constant current regulator constructed in accordance with a second embodiment of the present invention.

FIG. 9 shows a control circuit in accordance with a second embodiment of the present invention, which is applicable to a boost type half-cycle sensing constant current regulator. The constant current regulator in accordance with the second embodiment of the present invention, broadly designated at 3a, comprises a switch unit SW having a drain connected via an inductor L to an input voltage Vin and further connected via a diode D to an output voltage Vo. The switch unit SW has a source that is grounded.

A load 2, which is comprised of a number of LEDs connected in series, has an end connected to the output voltage Vo and an opposite end grounded.

The switch unit SW has a gate connected to a gate driver circuit 31. A PWM controller 32 has an error signal input terminal 32a connected to an RC circuit constituted by a resistor Rc and a capacitor Cc. The error signal input terminal 32a of the PWM controller 32 functions to receive an error signal Ve, based on which the PWM controller 32 generates a pulse width modulation signal $V_{PWM}$ to the gate driver circuit 31, which in turn generates a switching control signal $V_{SW}$ to control the switching operation of the switch unit SW.

The constant current regulator 3a of the present invention further comprises a current sensing circuit loop 30a, functioning to detect or sense the current flowing through the switch unit SW and providing inputs to a differential amplifier 36, which generates and supplies the error signal Ve to the PWM controller 32.

The current sensing circuit loop 30a comprises a current setting circuit 33a, which receives a working voltage from the input voltage Vin. The current setting circuit 33a is comprised of an adjustable current source Iset and a serially connected resistor Rref. When a current from the adjustable current source Iset flows through the resistor Rref, a set voltage Vset is obtained across the resistor Rref.

A current detection circuit 34a receives a working voltage from the input voltage Vin. The current detection circuit 34a is comprised of a detection current Is and a serially connected resistor Rs. When the detection current Is flows through the resistor Rs, a detection voltage Vs is induced across the resistor Rs. The detection current Is and a load current $I_L$ flowing through the switch unit SW are of a proportional relationship N:1, such as the phantom line indicating the N:1 current ratio illustrated in the drawing.

Since the instant embodiment is applied to a boost type half-cycle sensing constant current regulator, the detection voltage Vs generated by the current detection circuit 34a is subjected to the processing of a half-cycle compensation circuit 35a to generate a half-cycle compensated detection voltage Vs' to a detection voltage input terminal 36a of the differential amplifier 36. The set voltage Vset generated by the current setting circuit 33a is applied to a set voltage input terminal 36b of the differential amplifier 36. Based on the set voltage (feedback signal) Vset and the half-cycle compensated detection voltage Vs', the differential amplifier 36 generates, at a differential signal output terminal 36c thereof, the error voltage Ve, which is then applied to the error signal input terminal 32a of the PWM controller 32.

The current setting circuit 33a is composed of a control circuit that is a current mirror circuit, which is identical to the current setting circuit 33 (FIG. 6) of the previous embodiment.

Figure 10:
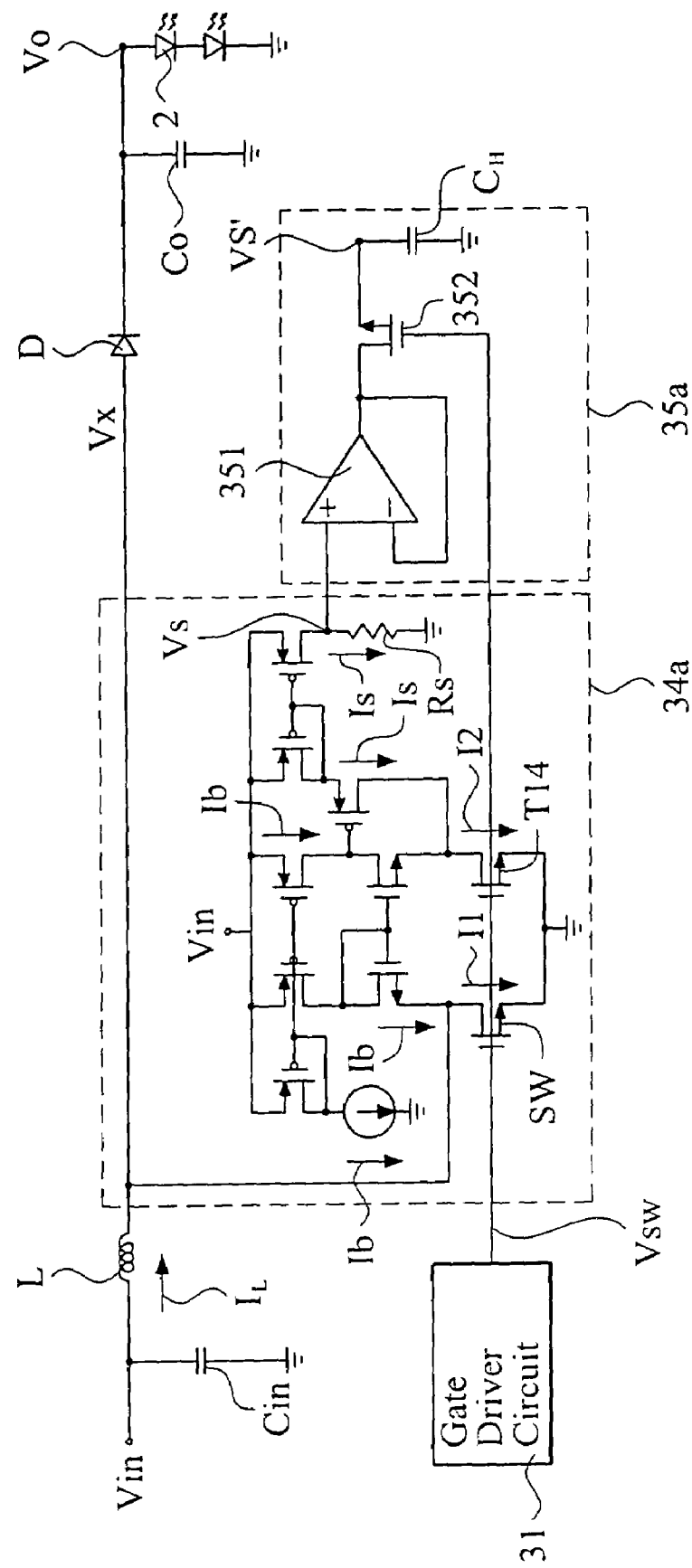
FIG. 10 is a further, detailed circuit diagram of a current detection circuit and a half-cycle compensation circuit of the constant current regulator of FIG. 9.

FIG. 10 shows a further, detailed control circuit of the current detection circuit 34a and the half-cycle compensation circuit 35a of FIG. 9, comprising a switch unit SW and other switch units, which tog ether form a current mirror circuit. When the switch unit SW is conducted on, the following relationships among currents I1, I2, $I_L$, Is are satisfied:

$I1 \gg Ib, I2 \gg Ib$ $I1 = N \times I2$ $I1 = I_L = N \times I2 = N \times Is = N \times (Iset \times Rref/Rs)$ $I_L/N = Is$ Namely, the detection current Is and the load current $I_L$ satisfy N:1 ratio.

The half-cycle compensation circuit 35a comprises a coupler 351, a half-cycle compensation switch unit 352, and a capacitor $C_H$. The coupler 352 receives the detection voltage Vs from the current detection circuit 34a. The half-cycle compensation switch unit 352 has a gate connected to the gate driver circuit 31 and is controlled by the switching control signal $V_{SW}$ generated by the gate driver circuit 31. The half-cycle compensation switch unit 352 has a source connected to the capacitor $C_H$.

Figure 11:
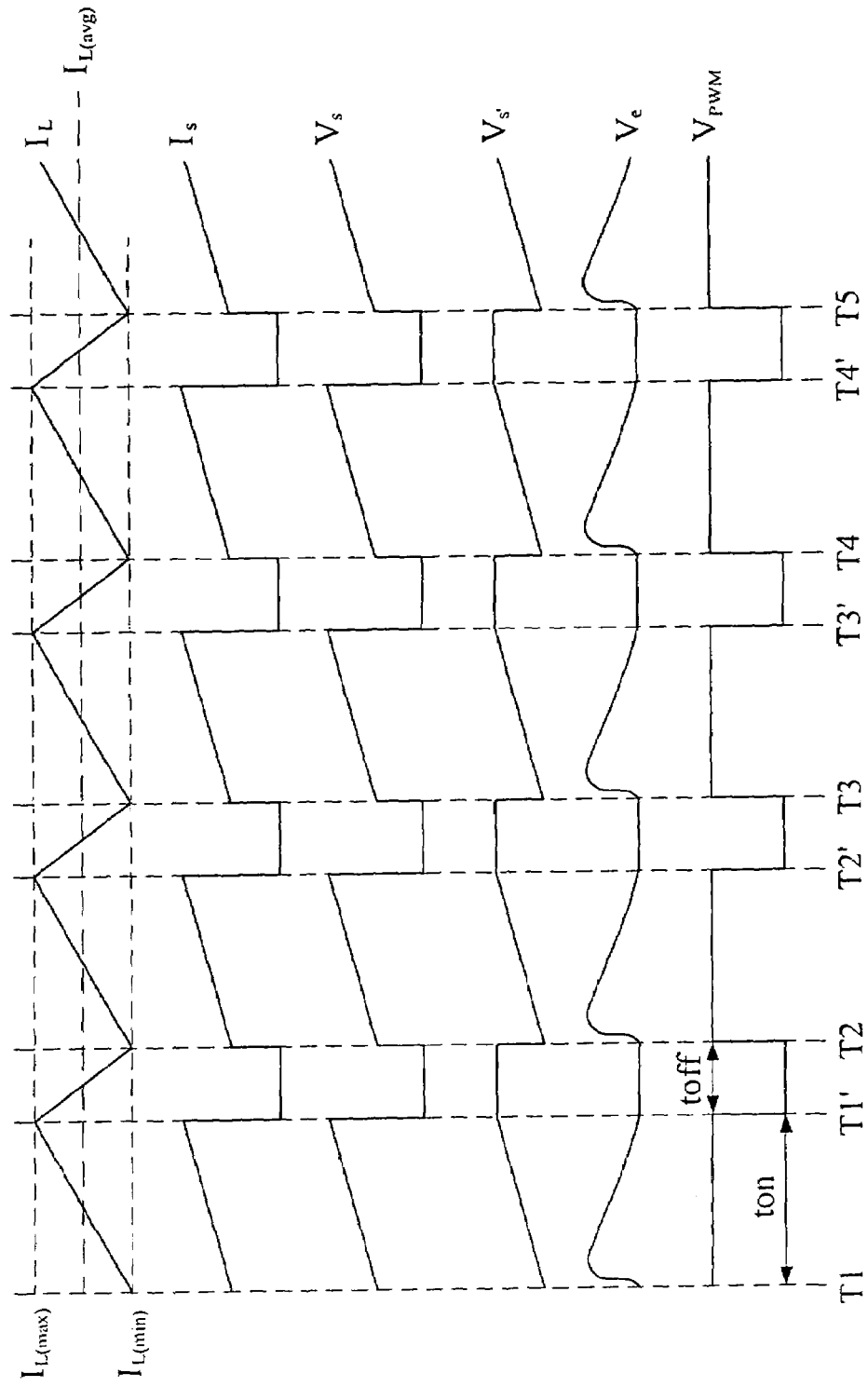
FIG. 11 shows waveforms taken at nodes of the constant current regulator of FIG. 9.

FIG. 11 shows the waveforms of signals taken at the nodes of the circuit of FIG. 9. When a load current $I_L$ flows through the load 2, the current detection circuit 34a detects a detection current Is caused by a positive half cycle (within the time period ton between time points T1 and T1') of the load current $I_L$ and induces a detection voltage Vs. The detection voltage Vs, after transmitted through the half-cycle compensation circuit 35a, is applied to the differential amplifier 36 to induce an error signal Ve at the differential signal output terminal 36c of the differential amplifier 36. The PWM controller 32, when receiving the error signal Ve, generates a gate driving voltage $V_{PWM}$ of a high level, which is processed by the gate driver circuit 31 to generate a switching control signal $V_{SW}$ that controls the switching operation of the switch unit SW.

When a negative half-cycle (within the time period toff between time points T1' and T2) of the load current $I_L$ passes through the load 2, the current detection circuit 34a detects no load current $I_L$, and induces zero detection voltage Vs. Within the negative half cycle of the load current $I_L$, the capacitor $C_H$ of the half-cycle compensation circuit 35a maintains the detection voltage Vs that was generated by the current detection circuit 34a to ensure that the PWM controller 32 does not take false action in carrying out pulse width modulation.

Figure 12:
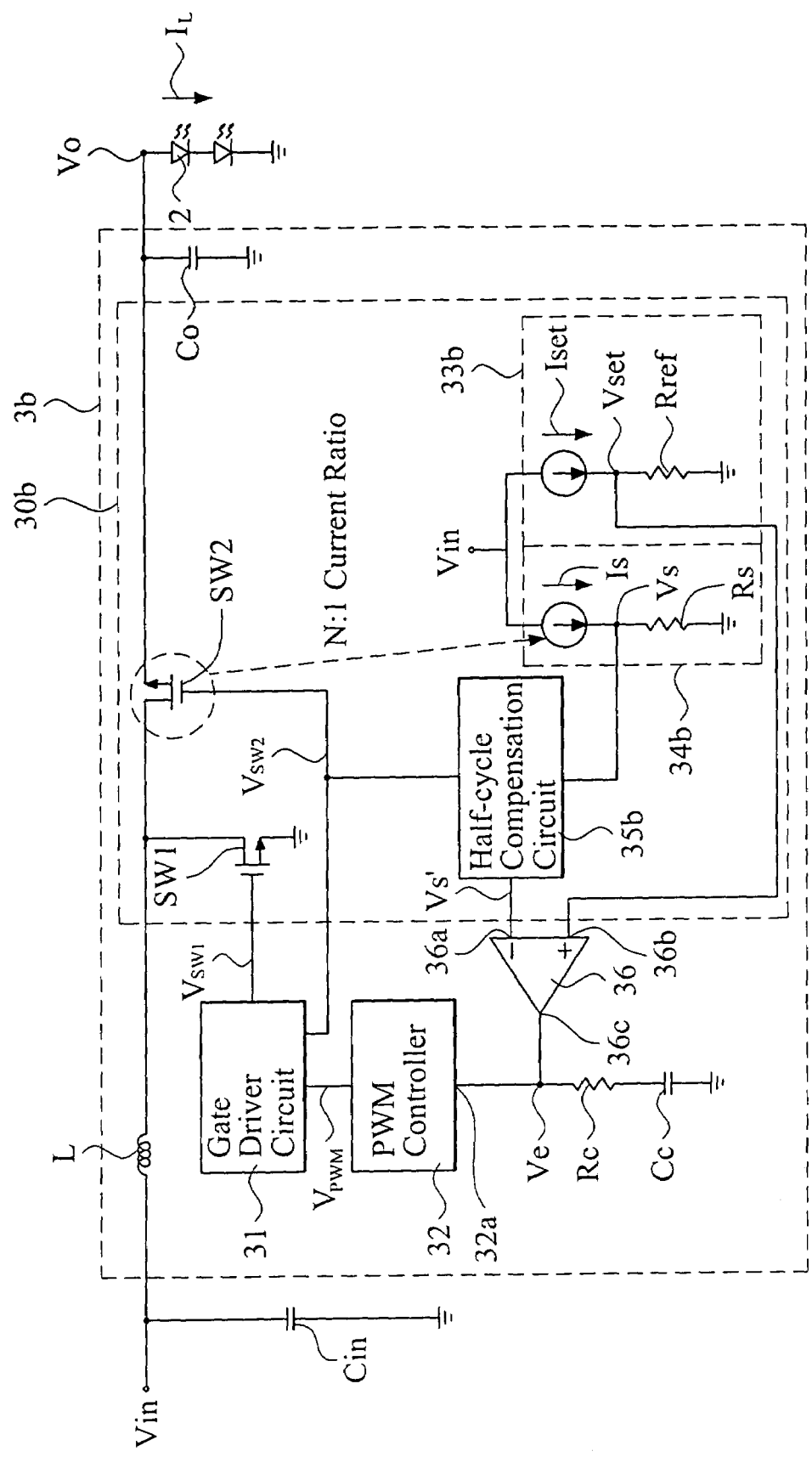
FIG. 12 is a circuit diagram of a constant current regulator constructed in accordance with a third embodiment of the present invention.

FIG. 12 shows a control circuit in accordance with a third embodiment of the present invention, which is also applicable to a boost type half-cycle sensing constant current regulator. The constant current regulator in accordance with the third embodiment of the present invention, broadly designated at 3b, comprises a first switch unit SW1 and a second switch unit SW2, wherein the first switch unit SW1 has a drain connected via an inductor L to an input voltage Vin and a source grounded. The second switch unit SW2 has a drain connected to the drain of the first switch unit SW1 and a source connected to an output voltage Vo. The first switch unit SW1 and the second switch unit SW2 both have a gate connected to a gate driver circuit 31 to respectively receive a first switching control signal $V_{SW1}$ and a second switching control signal $V_{SW2}$ to be controlled thereby.

A PWM controller 32 has an error signal input terminal 32a connected to an Rc circuit constituted by a resistor Rc and a capacitor Cc. The error signal input terminal 32a of the PWM controller 32 functions to receive an error signal Ve, based on which the PWM controller 32 generates a pulse width modulation signal $V_{PWM}$ to the gate driver circuit 31, which in turn generates the first and second witching control signals $V_{SW1}$ and $V_{SW2}$ to respectively control the switching operations of the first and second switch units SW1 and SW2.

The constant current regulator 3b of the present invention further comprises a current sensing circuit loop 30b, functioning to detect or sense the current flowing through the switch units and providing inputs to a differential amplifier 36, which generates and supplies the error signal Ve to the PWM controller 32.

The current sensing circuit loop 30b comprises a current setting circuit 33b, which receives a working voltage from the input voltage Vin. The current setting circuit 33b is comprised of an adjustable current source Iset and a serially connected resistor Rref. When a current from the adjustable current source Iset flows through the resistor Rref, a set voltage Vset is obtained across the resistor Rref.

A current detection circuit 34b receives a working voltage from the input voltage Vin. The current detection circuit 34b is comprised of a detection current Is and a serially connected resistor Rs. When the detection current Is flows through the resistor Rs, a detection voltage Vs is induced across the resistor Rs. The detection current Is and a load current $I_L$ flowing through the switch unit SW are of a proportional relationship N:1, such as the phantom line indicating the N:1 current ratio illustrated in the drawing.

Since the instant embodiment is applied to a boost type half-cycle sensing constant current regulator, the detection voltage Vs generated by the current detection circuit 34b is subjected to the processing of a half-cycle compensation circuit 35b to generate a half-cycle compensated detection voltage Vs' to a detection voltage input terminal 36a of the differential amplifier 36. The set voltage Vset generated by the current setting circuit 33b is applied to a set voltage input terminal 36b of the differential amplifier 36. Based on the set voltage (feedback signal) Vset and the half-cycle compensated detection voltage Vs', the differential amplifier 36 generates, at a differential signal output terminal 36c thereof, the error voltage Ve, which is then applied to the error signal input terminal 32a of the PWM controller 32.

The current setting circuit 33b is composed of a control circuit that is a current mirror circuit, which is identical to the current setting circuit 33 (FIG. 6) of the first embodiment.

Figure 13:
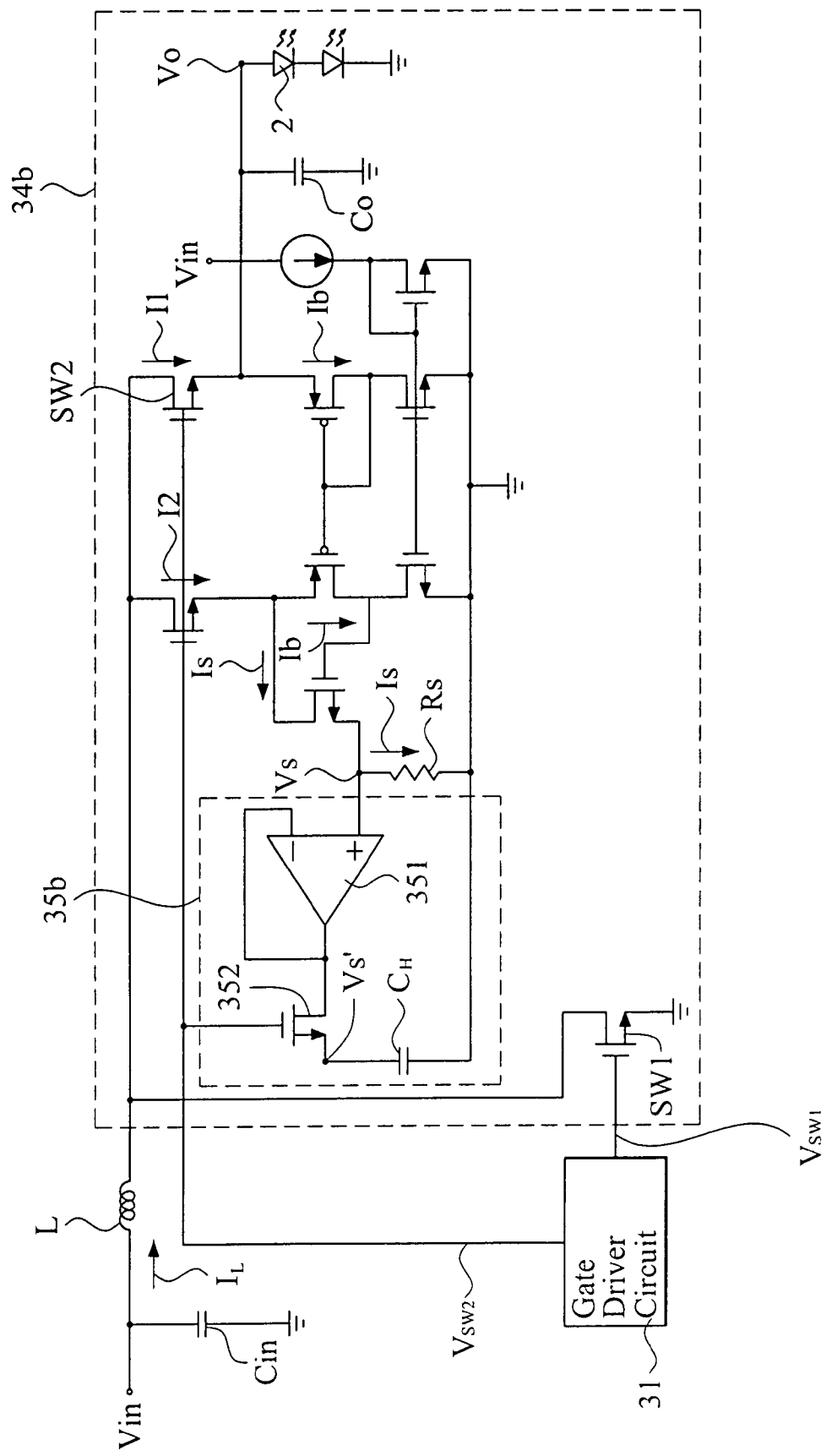
FIG. 13 is a further, detailed circuit diagram of a current detection circuit and a half-cycle compensation circuit of the constant current regulator of FIG. 12.

FIG. 13 shows a further, detailed control circuit of the current detection circuit 34b and the half-cycle compensation circuit 35b of FIG. 12, comprising a first switch unit SW1, a second switch unit SW2, and other switch units, which together form a current mirror circuit. When the first switch unit SW1 is conducted off, and the second switch unit SW2 is conducted on, the following relationships among currents I1, I2, $I_L$, Is are satisfied:

$I1 \gg Ib, I2 \gg Ib$ $I1 = N \times I2$ $I1 = I_L = N \times I2 = N \times Is = N \times (Iset \times Rref/Rs)$ $I_L/N = Is$ Namely, the detection current Is and the load current $I_L$ satisfy N:1 ratio.

The half-cycle compensation circuit 35b comprises a coupler 351, a half-cycle compensation switch unit 352, and a capacitor $C_H$. The coupler 352 receives the detection voltage Vs from the current detection circuit 34b. The half-cycle compensation switch unit 352 has a gate connected to the gate driver circuit 31 and is controlled by the second switching control signal $V_{SW2}$ generated by the gate driver circuit 31. The half-cycle compensation switch unit 352 has a source connected to the capacitor $C_H$.

Figure 14:
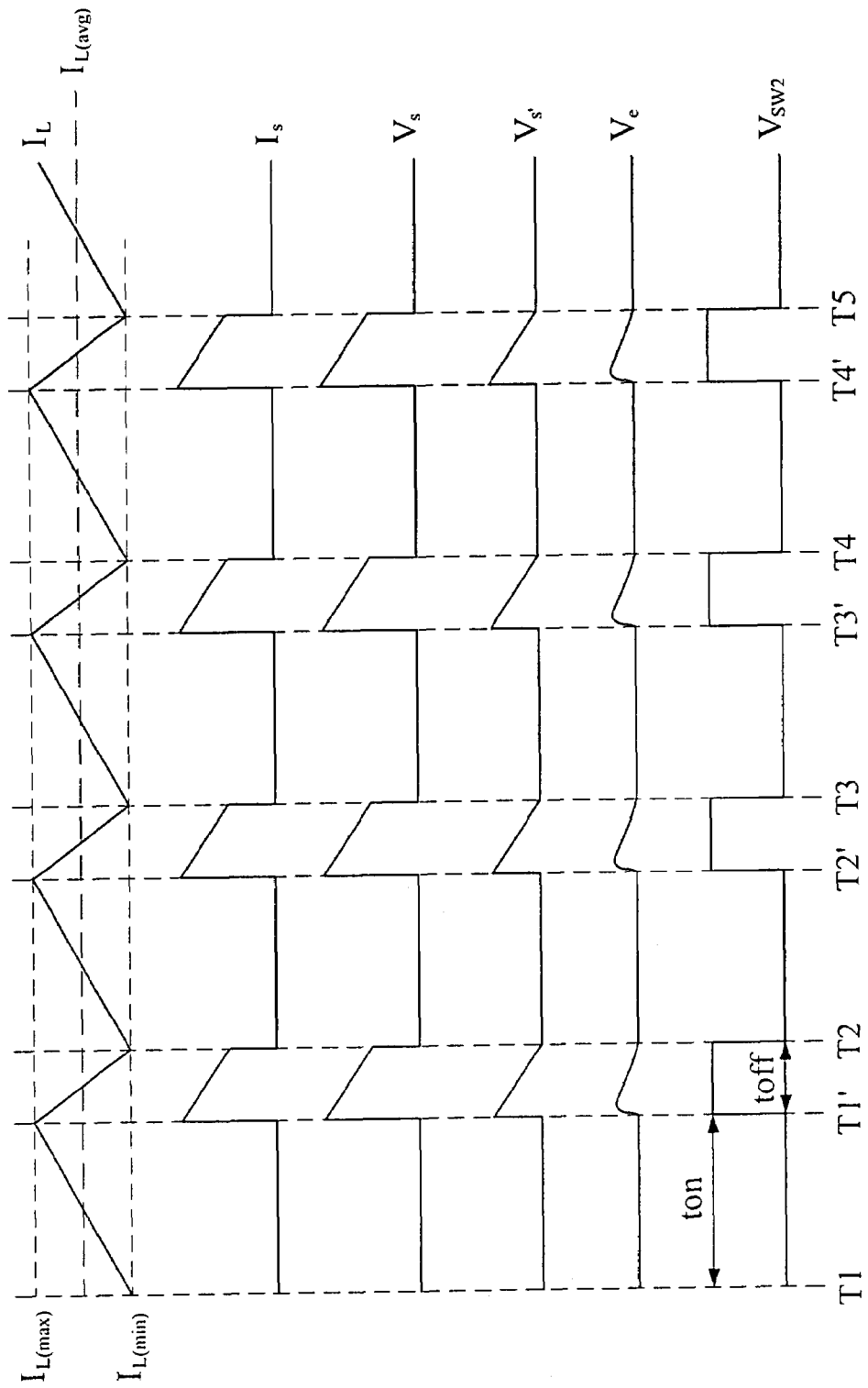
FIG. 14 shows waveforms taken at nodes of the constant current regulator of FIG. 12.

FIG. 14 shows the waveforms of signals taken at the nodes of the circuit of FIG. 12. When a load current $I_L$ flows through the load 2, the current detection circuit 34b detects a detection current Is caused by a negative half cycle (within the time period between time points T1' and T2) of the load current $I_L$ and induces a detection voltage Vs. The detection voltage Vs, after transmitted through the half-cycle compensation circuit 35b, is applied to the differential amplifier 36 to induce an error signal Ve at the differential signal output terminal 36c of the differential amplifier 36. By the receipt of the error signal Ve by the PWM controller 32, the gate driver circuit 31 generates the second switching control signal $V_{SW2}$ that controls the switching operation of the second switch unit SW2.

Figure 15:
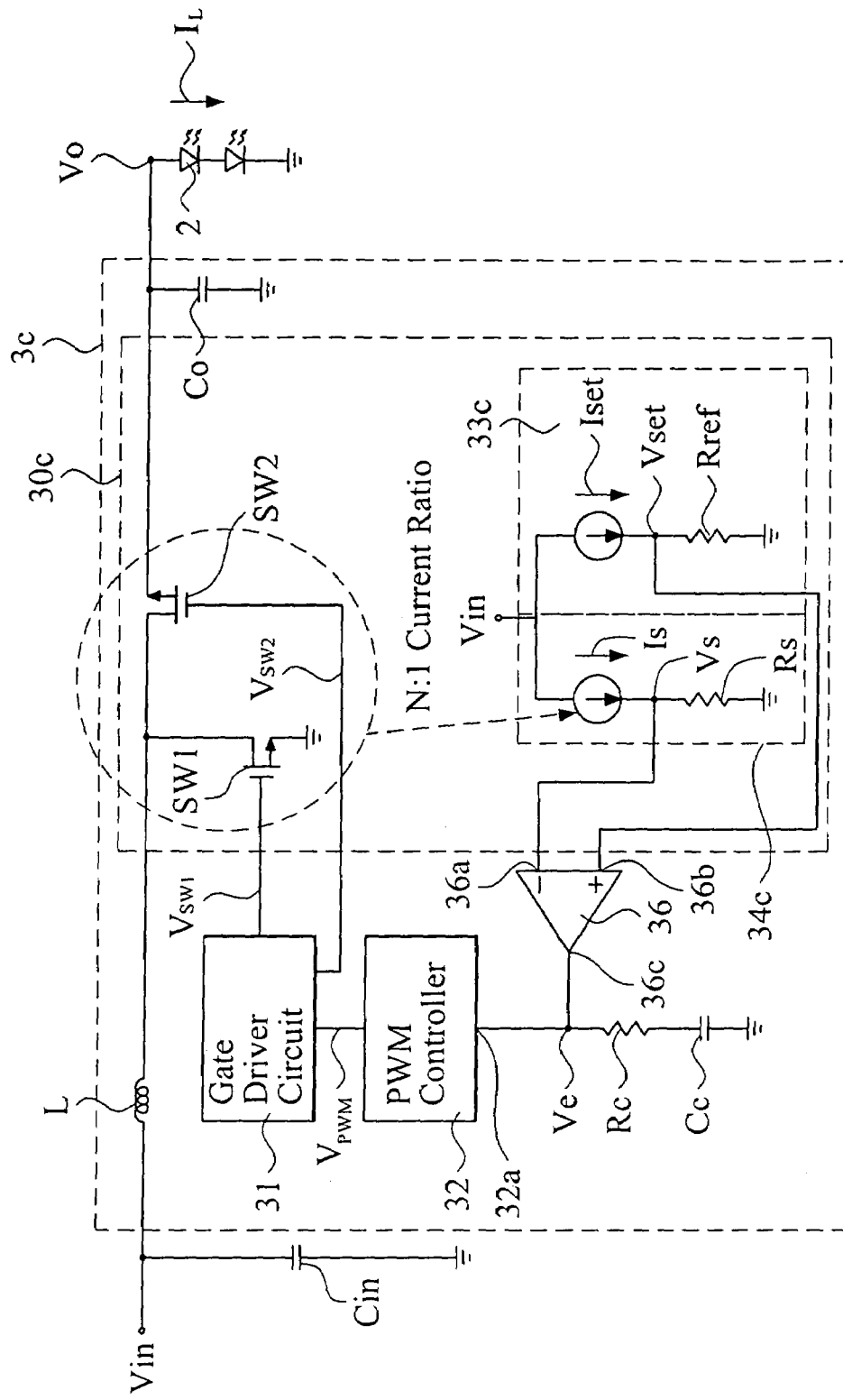
FIG. 15 is a circuit diagram of a constant current regulator constructed in accordance with a fourth embodiment of the present invention.

FIG. 15 shows a control circuit in accordance with a fourth embodiment of the present invention, which is also applicable to a boost type full-cycle sensing constant current regulator. The constant current regulator in accordance with the third embodiment of the present invention, broadly designated at 3c, comprises a first switch unit SW1 and a second switch unit SW2, wherein the first switch unit SW1 has a drain connected via an inductor L to an input voltage Vin and a source grounded. The second switch unit SW2 has a drain connected to the drain of the first switch unit SW1 and a source connected to an output voltage Vo. The first switch unit SW1 and the second switch unit SW2 both have a gate connected to a gate driver circuit 31 to respectively receive a first switching control signal $V_{SW1}$ and a second switching control signal $V_{SW2}$ to be controlled thereby.

A PWM controller 32 has an error signal input terminal 32a connected to an RC circuit constituted by a resistor Rc and a capacitor Cc. The error signal input terminal 32a of the PWM controller 32 functions to receive an error signal Ve, based on which the PWM controller 32 generates a pulse width modulation signal $V_{PWM}$ to the gate driver circuit 31, which in turn generates the first and second witching control signals $V_{SW1}$ and $V_{SW2}$ to respectively control the switching operations of the first and second switch units SW1 and SW2.

The constant current regulator 3c of the present invention further comprises a current sensing circuit loop 30c, functioning to detect or sense the current flowing through the switch units and providing inputs to a differential amplifier 36, which generates and supplies the error signal Ve to the PWM controller 32.

The current sensing circuit loop 30c comprises a current setting circuit 33c, which receives a working voltage from the input voltage Vin. The current setting circuit 33c is comprised of an adjustable current source Iset and a serially connected resistor Rref. When a current from the adjustable current source Iset flows through the resistor Rref, a set voltage Vset is obtained across the resistor Rref.

A current detection circuit 34c receives a working voltage from the input voltage Vin. The current detection circuit 34c is comprised of a detection current Is and a serially connected resistor Rs. When the detection current Is flows through the resistor Rs, a detection voltage Vs is induced across the resistor Rs. The detection current Is and a load current $I_L$ flowing through the switch unit SW are of a proportional relationship N:1, such as the phantom line indicating the N:1 current ratio illustrated in the drawing.

Since the instant embodiment is applied to a boost type full-cycle sensing constant current regulator, there is no need of the half-cycle compensation circuit as that employed in the previous embodiments.

The current setting circuit 33c is composed of a control circuit that is a current mirror circuit, which is identical to the current setting circuit 33 (FIG. 6) of the first embodiment.

Figure 16:
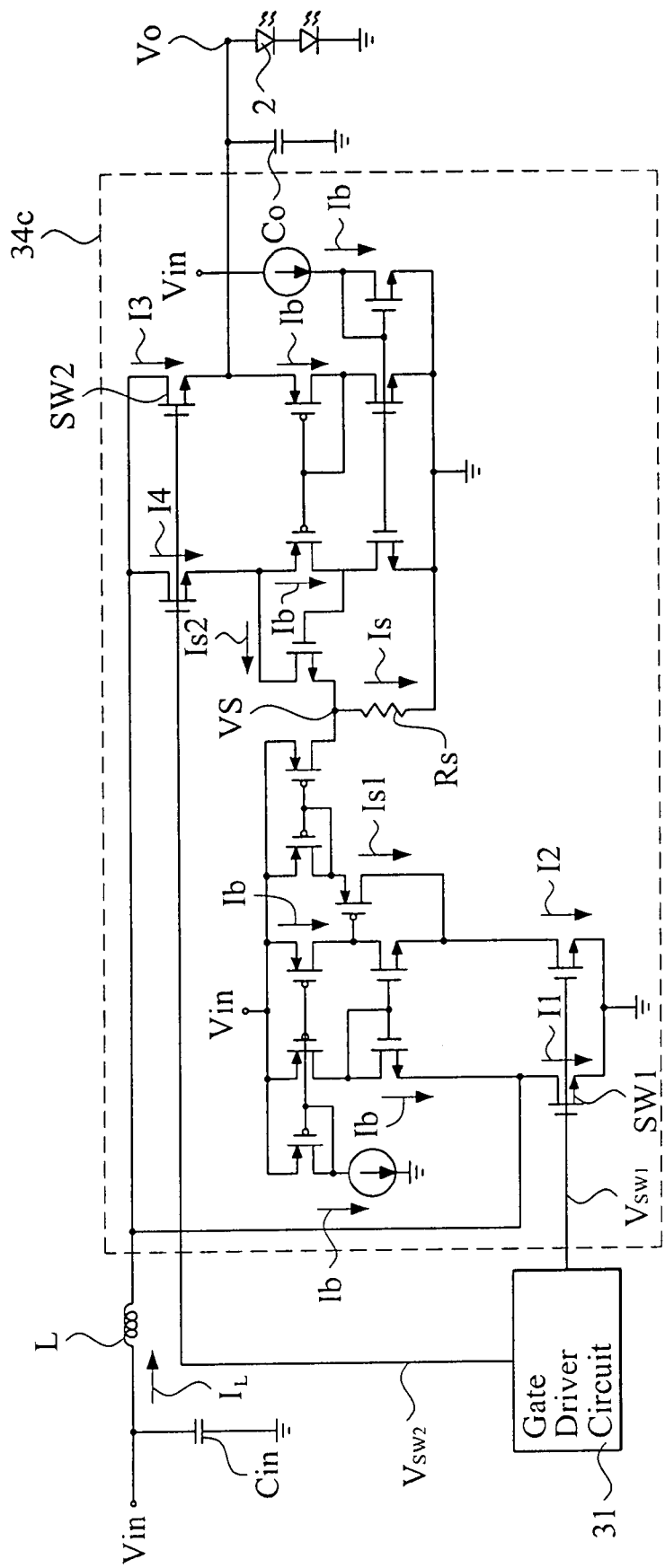
FIG. 16 is a further, detailed circuit diagram of a current detection circuit of the constant current regulator of FIG. 15.

FIG. 16 shows a further, detailed control circuit of the current detection circuit 34c of FIG. 15, comprising a first switch unit SW1, a second switch unit SW2, and other switch units, which together form a current mirror circuit.

When the first switch unit SW1 is conducted on and the second switch unit SW2 is conducted off, the following relationships among currents I1, I2, I3, I4, $I_L$, Is1, Is2 are satisfied:

$I1 \gg Ib, I2 \gg Ib$ $I1 = N \times I2$ $I1 = I_L = N \times I2 = N \times Is1$ $I_L/N = Is1$, and when the first switch unit SW1 is conducted off and the second switch unit SW2 is conducted on, the following relationships among currents I1, I2, I3, I4, $I_L$, Is1, Is2 are satisfied:

$$I3 \gg Ib, I4 \gg Ib$$

$$I3 = N \times I4$$

$$I3 = I_L = N \times I4 = N \times Is2$$

$$I_L/N = Is2.$$

Figure 17:
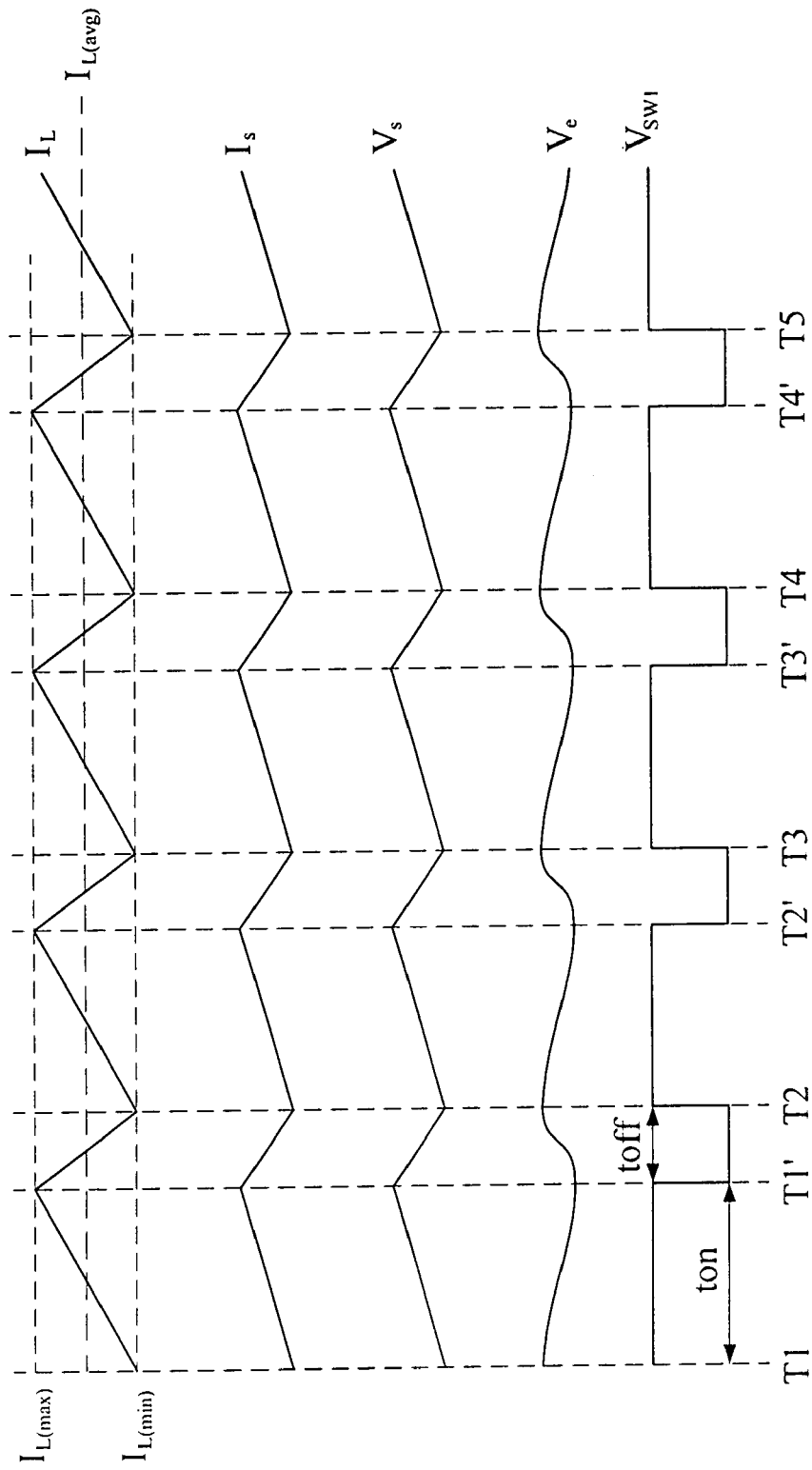
FIG. 17 shows waveforms taken at nodes of the constant current regulator of FIG. 15.

FIG. 17 shows the waveforms of signals taken at the nodes of the circuit of FIG. 15. When a load current $I_L$ flows through the load 2, the current detection circuit 34c detects a detection current Is1 caused by a positive half cycle (within the time period between time points T1 and T1') of the load current IL and induces a detection voltage Vs, which is applied to the differential amplifier 36 to generate the error signal Ve. When the negative half cycle (within the time period between time points T1' and T2) of the load current IL passes through the load 2, the current detection circuit 34c detects a detection current Is2 caused by the negative half cycle (within the time period between time points T1' and T2) of the load current IL and induces a detection voltage Vs, which is applied to the differential amplifier 36 to generate the error signal Ve. By the receipt of the error signal Ve by the PWM controller 32, the gate driver circuit 31 generates the first and second switching control signals $V_{SW1}$ and $V_{SW2}$ to control the switching operations of the first switch unit SW1 and the second switch unit SW2.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A constant current regulator, comprising:
   a switch unit having a first terminal connected to an input voltage and a second terminal connected via an inductor to an output voltage;
   a gate driver circuit connected to a gate of the switch unit;
   a pulse width modulation controller connected to the gate driver circuit and having an error signal input terminal;
   a current sensing circuit loop connected to the switch unit to detect a current flowing through the switch unit and generate a detection current that is in proportion to the current flowing through the switch unit by a given ratio, the detection current being applied through a detection resistor to induce a detection voltage; and
   a differential amplifier having a set voltage input terminal, a detection voltage input terminal, and a differential signal output terminal, the set voltage input terminal being connected to a set voltage, the detection voltage input terminal being connected to the detection resistor to receive the detection voltage;
   wherein the differential amplifier bases on the set voltage and the received detection voltage to generate an error voltage at the differential signal output terminal thereof, the error voltage being applied to the pulse width modulation controller, which in turn causes the gate driver circuit to generate a switching control signal to control the switch unit, thereby supplying a constant current to a load connected to the output voltage.

2. The constant current regulator as claimed in claim 1, wherein the load comprises a light-emitting diode array that comprises a number of light-emitting diodes connected in series.

3. The constant current regulator as claimed in claim 1, wherein the current sensing circuit loop comprises:
   a current setting circuit, which receives a working voltage from the input voltage and comprises an adjustable current source and a serially connected resistor, so that when a current from the adjustable current source flows through the resistor, the set voltage is induced across the resistor; and
   a current detection circuit, which receives a working voltage from the input voltage and comprises the detection resistor through which the detection current flows.

4. The constant current regulator as claimed in claim 3, wherein the detection voltage generated by the current detection circuit is applied to a half-cycle compensation circuit to generate a half-cycle compensated detection voltage, which is applied to the detection voltage input terminal of the differential amplifier.

5. The constant current regulator as claimed in claim 4, wherein the half-cycle compensation circuit comprises a coupler, a half-cycle compensation switch unit, and a capacitor, wherein the coupler receives the detection voltage from the current detection circuit and the half-cycle compensation switch unit has a gate connected to the gate driver circuit to be controlled by the switching control signal generated by the gate driver circuit, the switch unit having a source connected to the capacitor.

6. A constant current regulator, comprising:
   a switch unit having a first terminal connected via an inductor to an input voltage and further connected via a diode to an output voltage and a second terminal grounded;
   a gate driver circuit connected to a gate of the switch unit;
   a pulse width modulation controller connected to the gate driver circuit and having an error signal input terminal;
   a current sensing circuit loop connected to the switch unit to detect a current flowing through the switch unit and generate a detection current that is in proportion to the current flowing through the switch unit by a given ratio, the detection current being applied through a detection resistor to induce a detection voltage; and
   a differential amplifier having a set voltage input terminal, a detection voltage input terminal, and a differential signal output terminal, the set voltage input terminal being connected to a set voltage, the detection voltage input terminal being connected to the detection resistor to receive the detection voltage;
   wherein the differential amplifier bases on the set voltage and the received detection voltage to generate an error voltage at the differential signal output terminal thereof, the error voltage being applied to the pulse width modulation controller, which in turn causes the gate driver circuit to generate a switching control signal to control the switch unit, thereby supplying a constant current to a load connected to the output voltage.

7. The constant current regulator as claimed in claim 6, wherein the load comprises a light-emitting diode array that comprises a number of light-emitting diodes connected in series.

8. The constant current regulator as claimed in claim 6, wherein the current sensing circuit loop comprises:
   a current setting circuit, which receives a working voltage from the input voltage and comprises an adjustable current source and a serially connected resistor, so that when a current from the adjustable current source flows through the resistor, the set voltage is induced across the resistor; and a current detection circuit, which receives a working voltage from the input voltage and comprises the detection resistor through which the detection current flows.

9. The constant current regulator as claimed in claim 8, wherein the detection voltage generated by the current detection circuit is applied to a half-cycle compensation circuit to generate a half-cycle compensated detection voltage, which is applied to the detection voltage input terminal of the differential amplifier.

10. The constant current regulator as claimed in claim 9, wherein the half-cycle compensation circuit comprises a coupler, a half-cycle compensation switch unit, and a capacitor, wherein the coupler receives the detection voltage from the current detection circuit and the half-cycle compensation switch unit has a gate connected to the gate driver circuit to be controlled by the switching control signal generated by the gate driver circuit, the switch unit having a source connected to the capacitor.

11. A constant current regulator, comprising:
a first switch unit having a first terminal connected via an inductor to an input voltage and a second terminal grounded;
a second switch unit having a first terminal connected to the first terminal of the first switch unit and a second terminal connected to an output voltage;
a gate driver circuit connected to a gate of the first switch unit and a gate of the second switch unit to control the first and second switch units via a first and a second switching control signals respectively;
a pulse width modulation controller connected to the gate driver circuit and having an error signal input terminal;
a current sensing circuit loop connected to the first and second switch units to detect a current flowing through the second switch unit and generate a detection current that is in proportion to the current flowing through the second switch unit by a given ratio, the detection current being applied through a detection resistor to induce a detection voltage;
a half-cycle compensation circuit connected to the detection resistor of the current sensing circuit loop to receive the detection voltage generated by the detection resistor and generating a half-cycle compensated detection voltage; and
a differential amplifier having a set voltage input terminal, a detection voltage input terminal, and a differential signal output terminal, the set voltage input terminal being connected to a set voltage, the detection voltage input terminal being connected to the half-cycle compensation circuit to receive the half-cycle compensated detection voltage;
wherein the differential amplifier bases on the set voltage and the received half-cycle compensated detection voltage to generate an error voltage at the differential signal output terminal thereof, the error voltage being applied to the pulse width modulation controller, which in turn causes the gate driver circuit to generate the first and second switching control signals to respectively control the first and second switch units thereby supplying a constant current to a load connected to the output voltage.

12. The constant current regulator as claimed in claim 11, wherein the load comprises a light-emitting diode array that comprises a number of light-emitting diodes connected in series.

13. The constant current regulator as claimed in claim 11, wherein the current sensing circuit loop comprises:
a current setting circuit, which receives a working voltage from the input voltage and comprises an adjustable current source and a serially connected resistor, so that when a current from the adjustable current source flows through the resistor, the set voltage is induced across the resistor; and
a current detection circuit, which receives a working voltage from the input voltage and comprises the detection resistor through which the detection current flows.

14. The constant current regulator as claimed in claim 11, wherein the half-cycle compensation circuit comprises a coupler, a half-cycle compensation switch unit, and a capacitor, wherein the coupler receives the detection voltage from the current detection circuit and the half-cycle compensation switch unit has a gate connected to the gate driver circuit to be controlled by the second switching control signal generated by the gate driver circuit, the switch unit having a source connected to the capacitor.

15. A constant current regulator, comprising:
a first switch unit having a first terminal connected via an inductor to an input voltage and a second terminal grounded;
a second switch unit having a first terminal connected to the first terminal of the first switch unit and a second terminal connected to an output voltage;
a gate driver circuit connected to a gate of the first switch unit and a gate of the second switch unit to control the first and second switch units via a first and a second switching control signals respectively;
a pulse width modulation controller connected to the gate driver circuit and having an error signal input terminal;
a current sensing circuit loop connected to the first and second switch units to detect currents flowing through the first and second switch units and generate a detection current that is in proportion to a current flowing through the first and second switch units by a given ratio, the detection current being applied through a detection resistor to induce a detection voltage;
a differential amplifier having a set voltage input terminal, a detection voltage input terminal, and a differential signal output terminal, the set voltage input terminal being connected to a set voltage, the detection voltage input terminal being connected to the detection resistor;
wherein the differential amplifier bases on the set voltage and the detection voltage to generate an error voltage at the differential signal output terminal thereof, the error voltage being applied to the pulse width modulation controller, which in turn causes the gate driver circuit to generate the first and second switching control signals to respectively control the first and second switch units, thereby supplying a constant current to a load connected to the output voltage.

16. The constant current regulator as claimed in claim 15, wherein the load comprises a light-emitting diode array that comprises a number of light-emitting diodes connected in series.

17. The constant current regulator as claimed in claim 15, wherein the current sensing circuit loop comprises:
a current setting circuit, which receives a working voltage from the input voltage and comprises an adjustable current source and a serially connected resistor, so that when a current from the adjustable current source flows through the resistor, the set voltage is induced across the resistor; and
a current detection circuit, which receives a working voltage from the input voltage and comprises the detection resistor through which the detection current flows.

* * * * *